United States Patent
Schelstraete

(10) Patent No.: US 9,647,736 B1
(45) Date of Patent: May 9, 2017

(54) COMPRESSED TRAINING FOR MASSIVE MU-MIMO IN A WIRELESS LOCAL AREA NETWORK

(71) Applicant: Quantenna Communications, Inc., Fremont, CA (US)

(72) Inventor: Sigurd Schelstraete, Menlo Park, CA (US)

(73) Assignee: Quantenna Communications, Inc., Fremont, CA (US)

( * ) Notice: Subject to any disclaimer, the term of this patent is extended or adjusted under 35 U.S.C. 154(b) by 0 days.

(21) Appl. No.: 15/062,191

(22) Filed: Mar. 6, 2016

Related U.S. Application Data

(60) Provisional application No. 62/128,651, filed on Mar. 5, 2015, provisional application No. 62/128,668, filed on Mar. 5, 2015.

(51) Int. Cl.
*H04K 1/02* (2006.01)
*H04L 25/03* (2006.01)
(Continued)

(52) U.S. Cl.
CPC ......... *H04B 7/0456* (2013.01); *H04B 7/0452* (2013.01); *H04B 7/0626* (2013.01); *H04W 72/042* (2013.01)

(58) Field of Classification Search
CPC ... H04L 27/2035; H04L 27/2275; H04L 5/06; H04L 25/497; H04L 25/03343;
(Continued)

(56) References Cited

U.S. PATENT DOCUMENTS

| | | | | |
|---|---|---|---|---|
| 8,175,189 B2* | 5/2012 | Gaur | ............... | H04L 25/03343 375/233 |
| 8,571,138 B2* | 10/2013 | Gaur | ............... | H04L 25/03343 375/233 |

(Continued)

OTHER PUBLICATIONS

Unpublished Pending US Patent Application Sigurd Schelstraete, et. al. "Wireless Home Network Supporting Concurrent Links to Legacy Devices" U.S. Appl. No. 14/187,318, filed Feb. 23, 2014.
(Continued)

*Primary Examiner* — James M Perez
(74) *Attorney, Agent, or Firm* — IP Creators; Charles C Cary

(57) ABSTRACT

A WAP including: an MU grouping module; a constrained station identifier: a precode matrix calculator and compressor, and a spatial mapper. The MU grouping module selects a downlink MU group of stations and a number of downlink streams. The constrained station identifier identifies any of the stations in the MU group that are constrained stations and a limit on the number of training streams supported for the most constrained station. The precode matrix calculator calculates a precode matrix "Q" for spatially separating the aggregate number of MU-MIMO downlink streams. The precode matrix compressor responds to the identification of any constrained stations in the MU group, by compressing the precode matrix Q into a compressed precode matrix "C(Q)". The spatial mapper spatially maps a training portion of each packet with a selected one of C(Q) and Q as a precode matrix; based on whether or not a constrained station is identified within the MU group.

18 Claims, 5 Drawing Sheets

MASSIVE MIMO-WAP supporting MU links to Stream-Constrained MU Stations

Enhanced Massive MU-MIMO WAP downlinks

(51) Int. Cl.
*H04L 25/49* (2006.01)
*H04B 7/0456* (2017.01)
*H04B 7/0452* (2017.01)
*H04W 72/04* (2009.01)
*H04B 7/06* (2006.01)

(58) Field of Classification Search
CPC ..... H04L 25/03057; H04B 1/707; H04B 3/32; H04B 3/23
USPC .................................. 375/259–285, 295–352
See application file for complete search history.

(56) References Cited

U.S. PATENT DOCUMENTS

| | | | | |
|---|---|---|---|---|
| 8,686,883 | B2* | 4/2014 | Choi | H04L 1/06 341/106 |
| 8,750,358 | B2* | 6/2014 | Yue | H04B 7/0452 370/334 |
| 9,065,502 | B2* | 6/2015 | Lee | H04L 5/0023 |
| 9,071,299 | B1* | 6/2015 | Schelstraete | H04B 7/0452 |
| 9,078,142 | B1* | 7/2015 | Zhan | H04W 16/28 |
| 9,078,153 | B1* | 7/2015 | Schelstraete | H04W 88/08 |
| 9,088,962 | B2* | 7/2015 | Amiri | H04W 74/002 |
| 9,252,990 | B1* | 2/2016 | Zhan | H04L 25/03229 |
| 9,331,883 | B1* | 5/2016 | Schelstraete | H04L 27/2626 |
| 9,332,554 | B1* | 5/2016 | Heidari | H04B 7/0456 |
| 9,380,604 | B1* | 6/2016 | Amiri | H04W 52/283 |
| 9,420,530 | B1* | 8/2016 | Duxbury | H04W 52/0206 |
| 9,461,724 | B1* | 10/2016 | Schelstraete | H04B 7/0456 |
| 9,479,240 | B1* | 10/2016 | Caire | H04B 7/024 |
| 9,490,882 | B1* | 11/2016 | Schelstraete | H04B 7/043 |
| 2008/0260059 | A1* | 10/2008 | Pan | H04B 7/0417 375/260 |
| 2009/0323849 | A1* | 12/2009 | Bala | H04B 7/0417 375/267 |
| 2010/0162075 | A1* | 6/2010 | Brannstrom | H03M 13/11 714/752 |
| 2010/0214145 | A1* | 8/2010 | Narasimhan | H03M 1/1042 341/155 |
| 2010/0232494 | A1* | 9/2010 | Gaur | H04L 25/03343 375/233 |
| 2010/0254325 | A1* | 10/2010 | Narasimhan | H04B 7/024 370/329 |
| 2011/0058535 | A1* | 3/2011 | Djahanshahi | G01S 7/021 370/338 |
| 2011/0058598 | A1* | 3/2011 | Gaur | H04L 25/0242 375/233 |
| 2011/0058599 | A1* | 3/2011 | Gaur | H04B 7/0452 375/233 |
| 2011/0069687 | A1* | 3/2011 | Rezvani | H04L 12/6418 370/338 |
| 2011/0110345 | A1* | 5/2011 | Heidari | H04W 40/06 370/338 |
| 2011/0122971 | A1* | 5/2011 | Kim | H04B 7/0417 375/316 |
| 2011/0268060 | A1* | 11/2011 | Heidari | H04B 7/2606 370/329 |
| 2012/0051346 | A1* | 3/2012 | Herbert | H04L 29/12028 370/338 |
| 2012/0257664 | A1* | 10/2012 | Yue | H04B 7/0452 375/227 |
| 2012/0281774 | A1* | 11/2012 | Lee | H04B 7/0452 375/260 |
| 2012/0307934 | A1* | 12/2012 | Heidari | H04L 1/0003 375/295 |
| 2013/0114757 | A1* | 5/2013 | Park | H04L 27/2613 375/295 |
| 2013/0223548 | A1* | 8/2013 | Kang | H04B 7/024 375/260 |
| 2014/0140311 | A1* | 5/2014 | Lee | H04L 5/0023 370/329 |
| 2014/0293983 | A1* | 10/2014 | Amiri | H04W 74/002 370/338 |
| 2014/0328430 | A1* | 11/2014 | Park | H04L 25/0224 375/295 |
| 2015/0326340 | A1* | 11/2015 | Huang | H04B 7/0413 375/267 |
| 2016/0127019 | A1* | 5/2016 | Schelstraete | H04B 7/0626 370/252 |
| 2016/0323861 | A1* | 11/2016 | Cordeiro | H04B 7/0452 |
| 2016/0330047 | A1* | 11/2016 | Seok | H04L 27/2602 |

OTHER PUBLICATIONS

Unpublished Pending US Patent Application Sigurd Schelstraete "Matrix Processing Engine for Multi-Tone MIMO Systems" U.S. Appl. No. 14/462,505, filed Aug. 18, 2014.

Unpublished Pending US Patent Application Sigurd Schelstraete, et. al. "Composite Sounding for MIMO Beamforming in a Wireless Home Network" U.S. Appl. No. 14/701,495, filed Apr. 30, 2015.

* cited by examiner

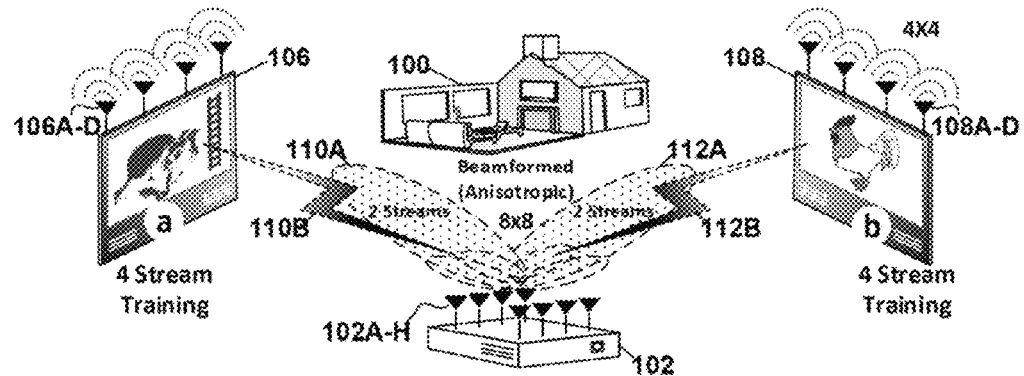
PRIOR ART: Typical Station's Stream Constraints (4) limit # of WAP's MU Downlink Streams (4)
FIG. 1A
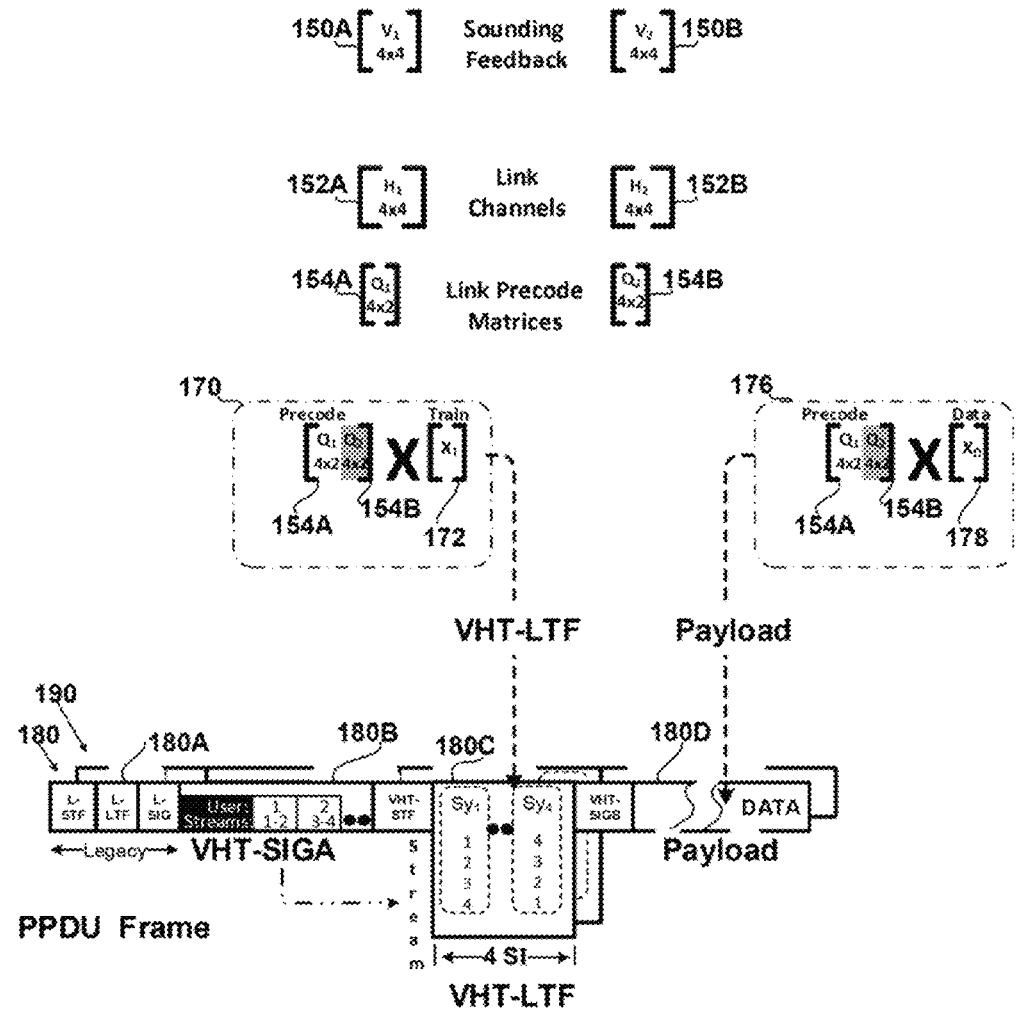
FIG. 1B   Number of Training Symbols(4) = # Streams(4)

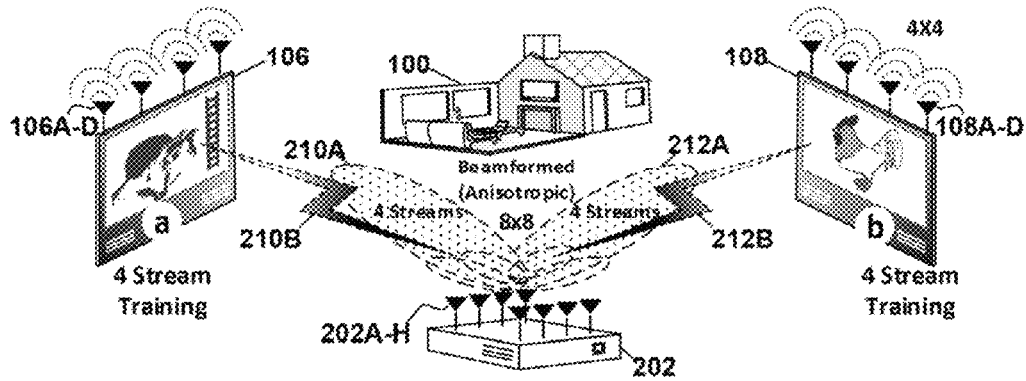
Station's constraints do NOT limit # of WAP's MU Downlink Streams
FIG. 2A
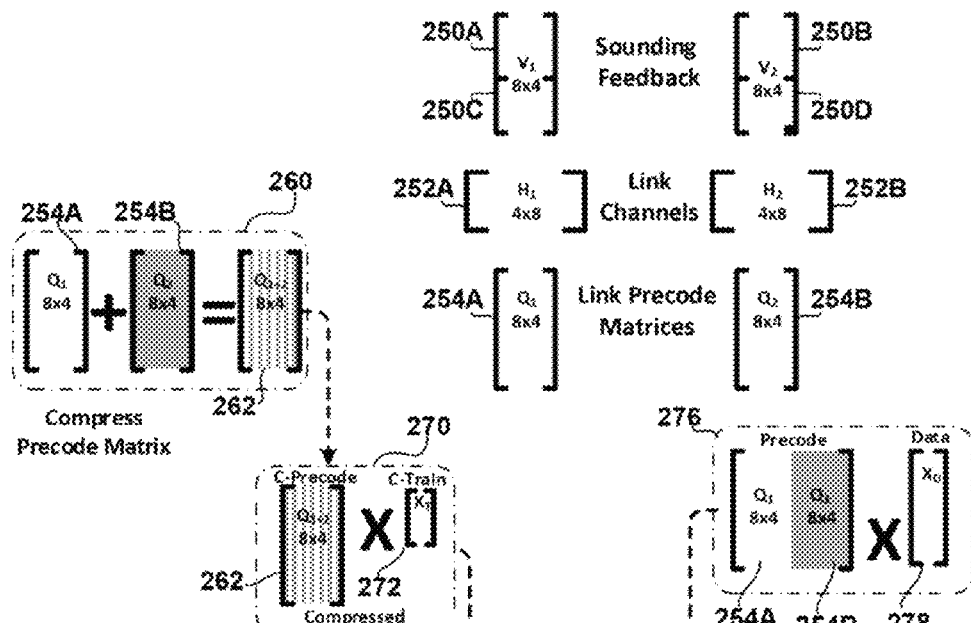
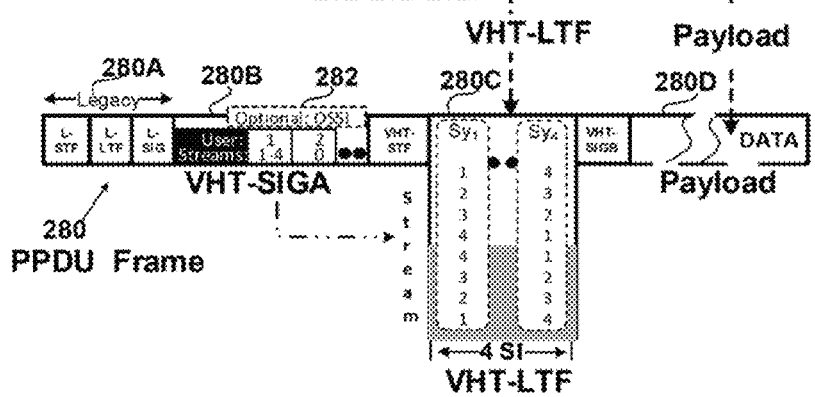
FIG. 2B Number of Training Symbols(4) = 1/2 #Streams(8)

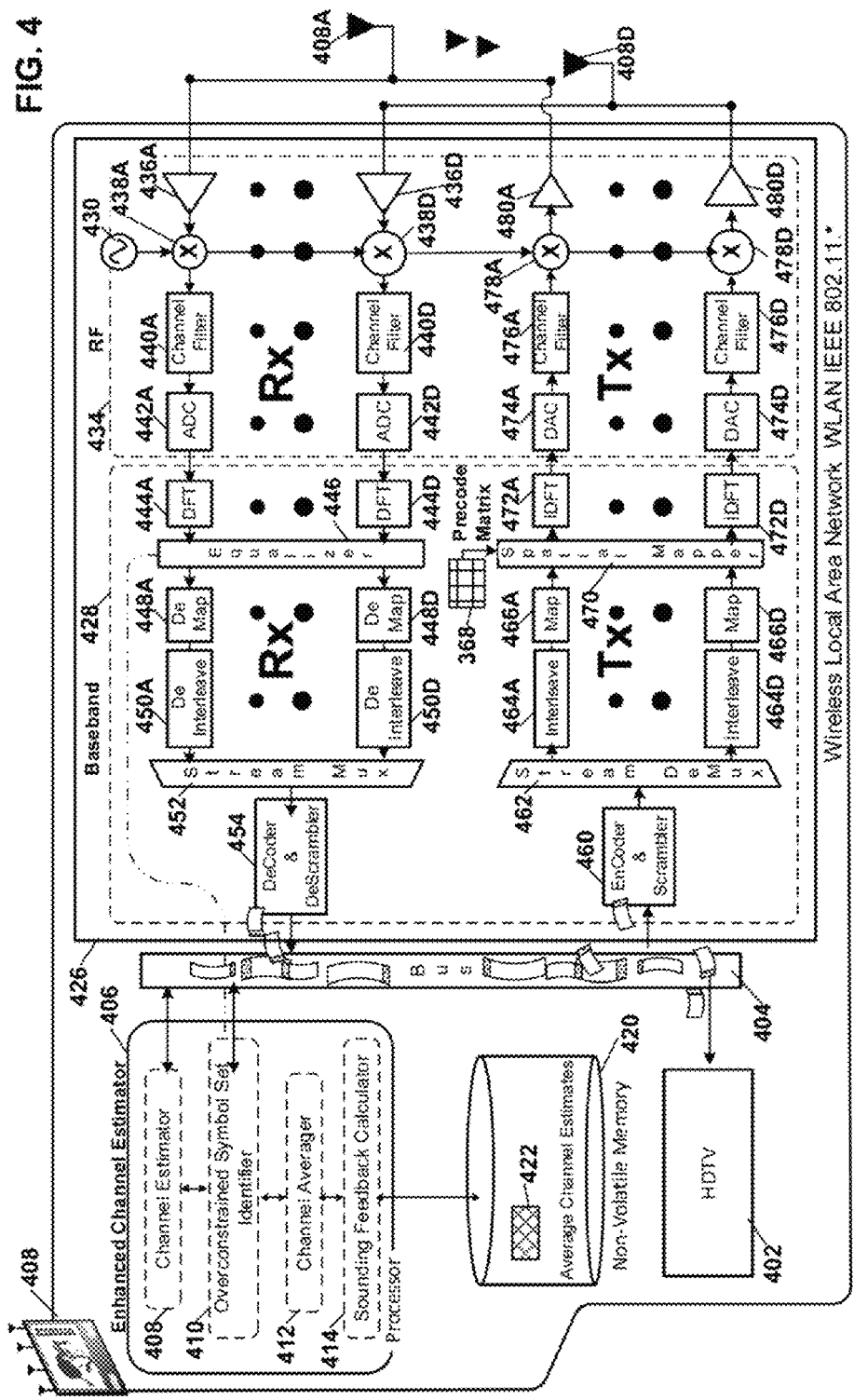

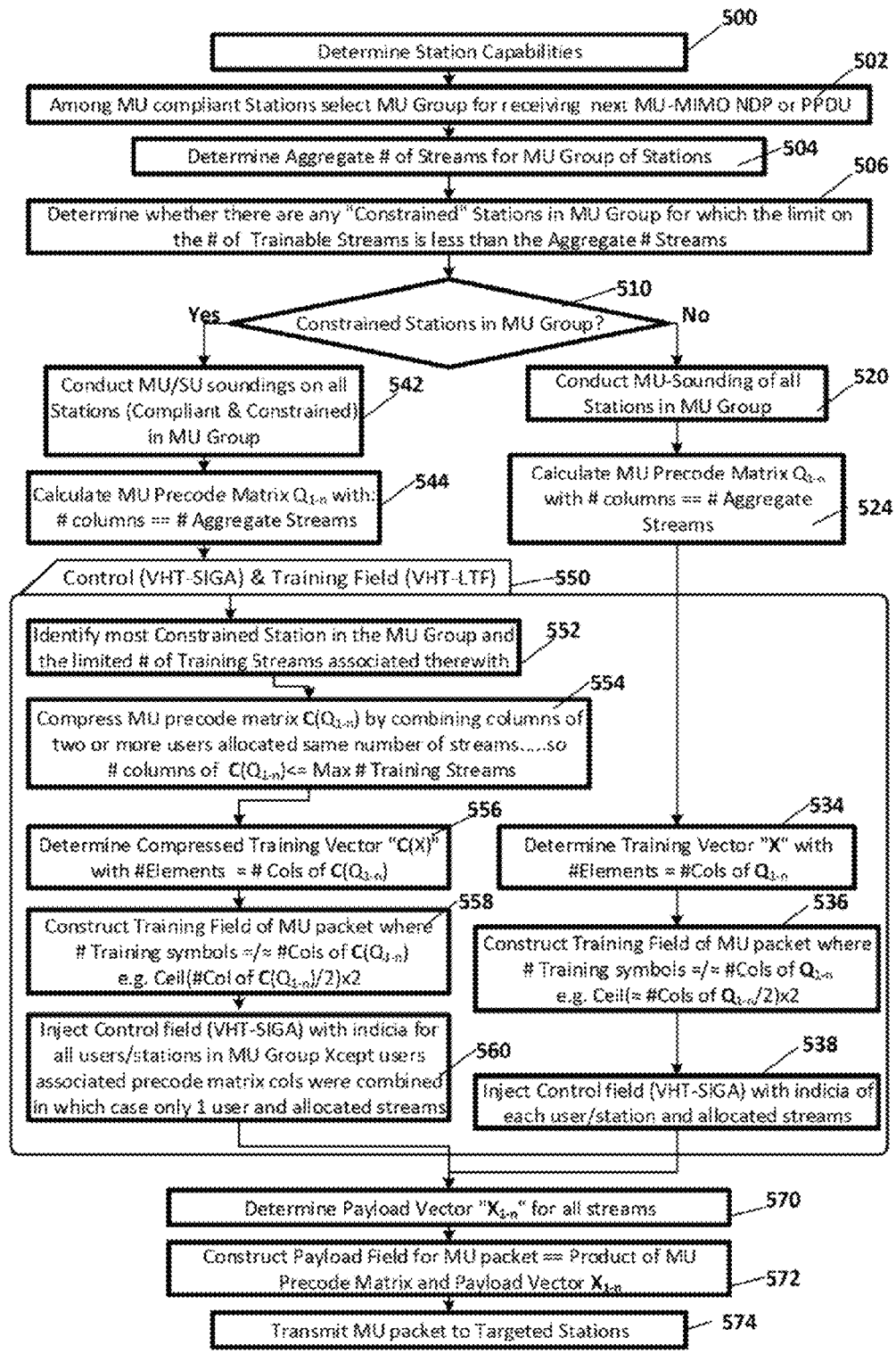
FIG. 5  Enhanced Massive MU-MIMO WAP downlinks

US 9,647,736 B1

COMPRESSED TRAINING FOR MASSIVE MU-MIMO IN A WIRELESS LOCAL AREA NETWORK

CROSS REFERENCE TO RELATED APPLICATION

This application claims the benefit of prior filed co-pending Provisional Applications: No. 62/128,651 filed on Mar. 5, 2015 entitled "Compressed Training Signal for MU-MIMO" and No. 62/128,668 filed on Mar. 5, 2015 entitled "11ax Preamble Design: Channel Training" both of which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and methods multi-user concurrent communications with same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

Initially wireless home networks had limited indoor range and throughput of 20 feet and 1 Mbps respectively. As such they were limited to delivery of data, where inconsistencies in delivery, e.g. temporary outages or throughput shortfalls, are not noticeable. With improvements in range and throughput of 250 feet and 600 Mbps came the possibility of wireless delivery to low latency audio-video streams for consumer devices such as TVs. Each TV requires 5-30 Mbps in uninterrupted throughput for acceptable picture quality.

What is needed are improved methods for multi-user communication on the wireless home network.

SUMMARY OF THE INVENTION

The present invention provides a method and apparatus which enables a massive multi-input multi-output (MIMO) wireless access point (WAP) apparatus to expand the number of streams that can be used for multi-user (MU) communications, to a level greater than the number of MU streams on which any one of the targeted stations are able to train. This increases the level of throughput that can be achieved by the WAP on downlink MU MIMO downlink communications.

In an embodiment of the invention a WAP having a plurality of antenna and supporting multiple-input multiple-output (MIMO) wireless communications with associated station nodes on a selected one of a plurality of communication channels is disclosed. The WAP includes: a Multi-User (MU) grouping module; a constrained station identifier; a precode matrix calculator; a precode matrix compressor; and a spatial mapper. The MU grouping module is configured to select a downlink MU group of at least two of the associated station nodes for concurrent reception of an MU MIMO downlink communication from the WAP apparatus and to allocate an aggregate number of downlink streams thereto. The constrained station identifier is configured to identify if any of the stations in the downlink MU Group are constrained stations that do not support training on the aggregate number of downlink streams allocated by the MU grouping module, and further in response to the identification of any constrained stations in the MU group, to identify a limit on the number of training streams supported for a most constrained one of the stations. The precode matrix calculator is configured to calculate a precode matrix "Q" for spatially separating the aggregate number of MU-MIMO downlink streams among corresponding receiving ones of the at least two associated station nodes. The precode matrix compressor is configured to respond to the identification of any constrained stations in the MU group, by compressing the precode matrix Q into a compressed precode matrix "C(Q)" having a column dimension equal to the limit on the number of training streams supported by the most constrained one of the stations in the MU group. The spatial mapper is configured for spatially mapping a payload portion of each packet in the MU-MIMO downlink communications using Q as a precode matrix; and a selected one of C(Q) and Q as a precode matrix for spatially mapping a training portion of each packet; where C(Q) is selected responsive to the identification of a constrained station in the MU Group and Q is selected absent said identification.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-B are respectively a system view, and a data processing diagram, of a Prior Art wireless home network exhibiting limited support for multi-user (MU) multiple-input multiple-output (MIMO) wireless communications;

FIGS. 2A-B are respectively a system view, and data processing diagram of a wireless home network in accordance with an embodiment of the invention which supports massive MU-MIMO by increasing the number of communication streams that can be used for MU MIMO groups;

FIG. 4 is a hardware block diagram of an MU-MIMO Station configured for improved stream characterization, in accordance with another embodiment of the invention; and FIG. 5 is a process flow diagram of processes associated with enhanced massive MU MIMO downlinks from the WAP shown in FIG. 3.

DETAILED DESCRIPTION OF THE EMBODIMENTS

Figure 3:
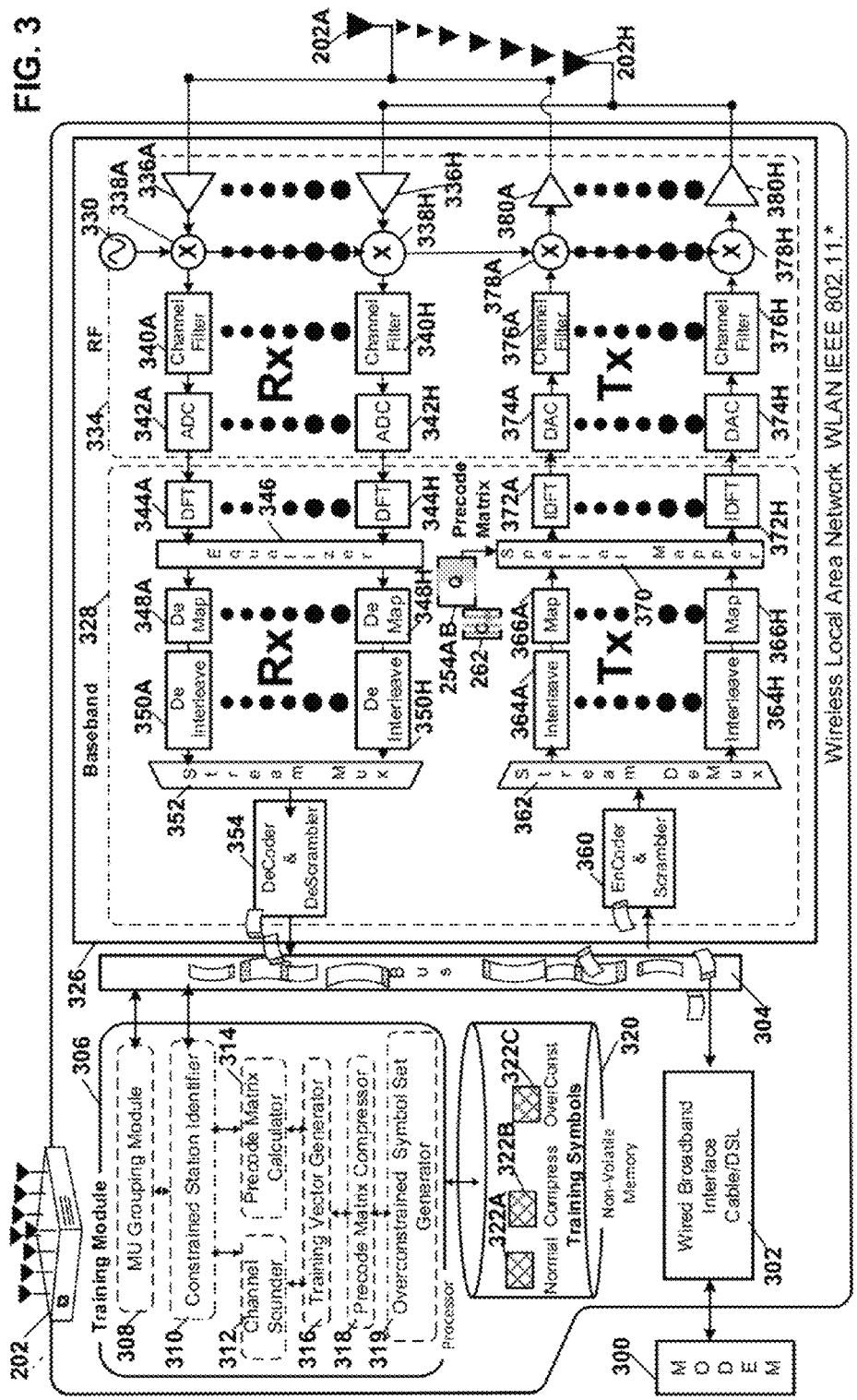
FIG. 3 is a hardware block diagram of the MU-MIMO WAP shown in FIG. 2A, in accordance with/an embodiment of the invention.

The demand in homes for increased WiFi capability, has prompted manufacturers to increase the number of antenna and streams supported by access points, and gateways to levels far above that of the stations they service. The current generation of massive multi-input multi-output (MIMO) wireless access point (WAP)s include eight antenna and associated streams. In the future the number is likely to increase further. This invention provides a method and apparatus which enables a massive MIMO WAP apparatus to expand the number of streams that can be used for multi-user (MU) communications, to a level greater than the number of MU streams on which any one of the targeted stations are able to train. This increases the level of throughput that can be achieved by the WAP on downlink MU MIMO downlink communications.

FIGS. 1A-B are respectively a system view, and a data processing diagram, of a Prior Art wireless home network exhibiting limited support for MU MIMO wireless communications.

FIG. 1A shows a home 100 with a wireless local area network (WLAN) consisting of an 8×8 WAP 102 and two 4×4 HD TVs 106-108. The WAP 102 is referred to as an 8×8, because it has 8 antenna 102A-H over which up to 8 discrete communication streams can be sent. The TV 106 is referred to as a 4×4, because it has 4 antenna 106A-D over which up to 4 discrete communication streams can be sent. The TV 108 is referred to as a 4×4, because it has 4 antenna 108A-D over which up to 4 discrete communication streams can be sent. The WAP 102 is shown in communication with the two TVs 106-108 simultaneously, over concurrent links 110B and 112B. These concurrent links are referred to as MU MIMO downlinks, because they involve a single packet being sent to two or more stations at once, with discrete data for each targeted user (a.k.a. station). In this case the data involves simultaneous downlinks of different TV channels to each of the targeted TVs. The WAP has the ability to transmit 8 streams of data at once, and each TV has the ability to receive 4 streams at once. However, as shown in FIG. 1A the downlink communication is limited to 2 downlink streams on RF signal strength lobe 110A from the WAP to TV 106 and 2 downlink streams on RF signal strength lobe 112A from the WAP to TV 108 for a total stream count of 4 streams. The reason for this reduction in streams below the maximum of 8 of which the WAP is capable, is twofold. The WAP can only communicate simultaneously with two or more MU targets if it can spatially separate its downlink transmission so that the corresponding streams destined of one station do not arrive at the other MU stations and vice versa. This spatial separation of the downlink transmission, which beamforms the MU packet in two or more directions at once towards the targeted MU stations is represented by the two anisotropic beamformed RF signal strength lobes 110A-112A shown in FIG. 1A directed from the WAP 102 to each of the target stations 106-108. In order for the WAP to generate these beamformed RF signal strength patterns, it must first have enough channel state information (CSI) from each of the MU-MIMO targeted stations to assemble the precode matrix necessary to accomplish this spatial mapping of the prospective MU downlink. A receiving station, limited as are these TVs 106-108, to providing 4 stream sounding feedback to an explicit sounding from the WAP, thus constrains the WAP to a maximum of 4 streams in any subsequent MU MIMO downlink communication, even though the WAP itself is capable of 8 or more. In other words, in the Prior Art case you can not have a Massive MU MIMO downlink unless each and every targeted station in the group supports sounding on all of the WAPs possible downlink streams, e.g. the 8 stream capability of WAP 102. Similar considerations would apply to any combination of WAP and MU station targets whenever, the stream capabilities of the WAP exceed those of one or more of the MU targeted stations.

FIG. 1B is a data processing diagram, of the Prior Art wireless home network exhibiting limited support for MU MIMO wireless communications as shown in FIG. 1A. Data processing begins with an explicit MU sounding by the WAP of each of the stations which are to be part of the upcoming MU downlink. During a capabilities exchange the WAP determines that the sounding feedback capability of each TV is limited to 4 streams. To determine the channel state information (CSI) necessary to spatially separate these four streams for the prospective MU downlink, the WAP transmits an explicit channel sounding to both stations in a single Null Data Packet (NDP). This packet is identical to the data packet 180 shown in FIG. 1B with the exception of the payload portion which is lacking. In response, the stations, e.g. TVs 106-108 each return a sounding feedback, 150A-B respectively, which includes 4×4 beamsteering matrices, a.k.a. "V" matrices and a companion per tone signal to noise (SNR) matrix (not shown). These incorporate information as to the unique 4×4 channel matrices "$H_1$" and "$H_2$" 152A-B between the WAP and each of the targeted stations.

Upon receipt of the sounding feedback the WAP 102 performs a singular value decomposition (SVD) of the V matrices to determine the 4×2 link precode matrices 154A-B which will be used for precoding selected portions of the upcoming MU-MIMO downlink packet 180, a.k.a. Protocol Payload Data Unit (PPDU).

In process block 170 the precode matrix consisting of the conjoined link precode matrices 154A-B form a 4×4 precode matrix which is multiplied by a permutation of a 4×1 training matrix $X_T$ known to the receiving stations. The resultant 4×1 vector forms one of the 4 training symbols injected into the VHT-LTF field 180C of the PPDU frame/packet 180. Each of the 4 training symbols is the product of the same 4×4 precode matrix and a distinct permutation of the training vector. These training symbols are used by the receiving station to determine how much the channel between the WAP and station has altered the training vector and this information is used by the receiving station to improve reception of the payload portion 180D of the packet 180.

The number of training symbols in the VHT-LTF varies depending on the number of streams sounded by the WAP for the MU downlink. Additionally, the 802.11ac standard specifies an even number of symbols in the VHT-LTF field. As discussed above, the number of streams in the MU sounding of the targeted stations is determined not by the number supported by the WAP, but by the generally more limited number supported by all the targeted MU stations.

In process block 176 the same 4×4 precode matrix 154A-B consisting of the conjoined link precode matrices 154A-B is multiplied by 4×1 data matrix 178 $X_D$. The resultant 4×1 vector forms one of the data symbols in the payload. The product of each of the data vectors in sequence and the same precode matrix forms each successive symbol in the payload 180D of the PPDU frame.

The PPDU frame 180, as specified in the IEEE 802.11ac standard for example, includes: a legacy portion 180A, and a very high throughput portion (VHT) consisting of various control, training and payload fields shown. The legacy portion includes the: L-STF, L-LTF and L-SIG fields. All stations whether or not MU compliant, can listen to the legacy portion for WLAN collision avoidance, e.g. carrier sense multiple access (CSMA), and for synchronizing reception.

The VHT control portion includes: the VHT-SIG A field 180B, the VHT-STF and VHT-SIG B. The VHT-SIGA field contains bits which indicate what users, a.k.a. stations are going to receive what streams in an MU-MIMO downlink. In the example shown the VHT-SIGA field indicates user 1/station 106 will be receiving streams 1-2 of the MU MIMO downlink and user 2/station 108 will be receiving streams 3-4.

The VHT training portion includes the: VHT-LTF field 180C. The known training symbols in this field are used by the receiving station to determine how much the channel between the WAP and station has altered the known training vector and this information is used by the receiving station to improve reception of the payload portion 180D of the packet 180. What are actually different phase and amplitude permutations of the 4 streams in each training symbol are represented graphically by a simple change in the order of the streams in each symbol.

The VHT payload portion 180D of the PPDU frame may contain from 1 to over 1000 symbols of data precoded on each of the included streams, which is in this Prior Art case is limited to four (4). Generally, the amount of data that can be carried increases directly with the number of streams supported. Thus the fact that in this example due to station constraints, the WAP is only able to effect an MU downlink utilizing 4 of its 8 streams means that its downlink throughput is significantly reduced, e.g. cut in half. This state of affairs is indicated by the $2^{nd}$ PPDU packet 190 which will be required for this Prior Art WAP 102 to transmit an arbitrary fixed amount of data in a given amount of time to the two stations 106-108 in the MU downlink group.

FIGS. 2A-B are respectively a system view, and data processing diagram of a wireless home network in accordance with an embodiment of the invention which supports massive MU-MIMO by increasing the number of communication streams that can be used for MU MIMO groups.

FIG. 2A shows the home 100 with a WLAN consisting of an 8×8 WAP 202 and the two 4×4 HD TVs 106-108. The WAP 202 is again an 8×8 WAP but in this case has improved support for Massive MU-MIMO downlinks as compared to the prior art. The WAP 202 has 8 antenna 202A-H over which up to 8 discrete communication streams can be sent. The TVs 106 and 108 are the same as those shown in FIG. 1A. TV 106 is 4×4 with its 4 antenna 106A-D over which up to 4 discrete communication streams can be sent. TV 108 is 4×4 with its 4 antenna 108A-D over which up to 4 discrete communication streams can be sent. The WAP 202 is shown in communication with the two TVs 106-108 simultaneously, over concurrent links 210B and 212B. These concurrent links are referred to as MU MIMO downlinks, because they involve a single packet being sent to two or more stations at once, with discrete data for each targeted user (a.k.a. station). In this case the data involves simultaneous downlinks of different TV channels to each of the targeted TVs. The WAP has the ability to transmit 8 streams of data at once, and each TV has the ability to receive 4 streams at once. In this case however, as shown in FIG. 2A the downlink communication is not limited in number of streams to the constraints of the receiving stations, rather 4 downlink streams on RF signal strength lobe 210A are sent from the WAP to TV 106 and 4 downlink streams on RF signal strength lobe 212A are sent from the WAP to TV 108 for a total stream count of 8 streams. Thus, in this embodiment of the invention the WAP is able to double its downlink throughput to the same targeted stations as compared to the Prior Art case, without any change in the sounding feedback, training, or other capabilities of the targeted stations. The data processing responsible for this improvement is discussed below in connection with FIG. 2B.

FIG. 2B is a data processing diagram, of the wireless home network exhibiting enhanced support for massive MU MIMO wireless communications as shown in FIG. 2A. Processing begins with a determination of channel state information (CSI) for all eight channels between the WAP and each of the targeted stations. These 8×4 channel matrices $H_1$ 252A and $H_2$ 252B between the WAP and station 106 and 108 respectively may be determined directly with an implicit sounding. Alternately a sequence of 4×4 explicit soundings may be conducted and the V and SNR matrices therefrom may be used to interpolate the entire 8×4 sounding feedback matrices 252A, 252C $V_1$ and 252B, 252D $V_2$ therefrom.

Upon determination of the soundings the WAP 202 performs a singular value decomposition (SVD) of the H or V matrices to determine the 8×4 link precode matrices 254A-B which will be used for precoding selected portions of the upcoming MU-MIMO downlink packet 280, a.k.a. PPDU.

In process block 260 the two 8×4 link precode matrices $Q_1$ 254A, $Q_2$ 254B are compressed. In an embodiment of the invention compression is achieved by matrix addition of corresponding columns of one to the other, to form the resultant 8×4 compressed precode matrix 262 $Q_{1+2}$. The column dimension of this compressed matrix corresponds to the upper limit, or maximum, or cap on the number of streams on which all the target stations can train. In this case both target stations have the same four stream training limitation, as determined from their sounding feedback.

The more general requirement for compression of the precode matrix, is that the dimensions of the compressed precode matrix correspond to the maximum number of trainable streams on the most constrained of stations targeted for the MU downlink. Thus in the example shown in FIG. 2A, even if one of the TV's supported eight stream training, as long as the other TV only supported four stream training, it would be the most constrained of the two, that determined the width dimension, i.e. 4 columns, of the compressed precode matrix used for precoding the training symbols of both in the MU-MIMO downlink.

Next, in process block 270 the compressed precode matrix 262 is multiplied by a permutation of an 4×1 training matrix $X_T$ known to the receiving stations. The resultant 4×1 vector forms one of the 4 training symbols injected into the VHT-LTF field 280C of the PPDU frame/packet 280. Each of the 4 training symbols is the product of the same 8x4 compressed precode matrix and a distinct permutation of the training vector. These training symbols are used by the receiving station to determine how much the channel between the WAP and station has altered the training vector and this information is used by the receiving station to improve reception of the payload portion 280D of the packet 280. The compressed precoding results in each targeted station only "hearing" four streams of the downlink, with the other four streams spatially separated from same and directed to the other one of the targeted stations.

The 802.11ac standard specifies an even number of symbols in the VHT-LTF field. As discussed above, the number of symbols in the MU training field 280C, i.e. VHT-LTF, corresponds to the number of trainable streams supported by the most constrained one among all the targeted MU stations.

In process block 276 the uncompressed 8×8 precode matrix comprising the conjoined 8×link precode matrices 254A-B is multiplied by 8×1 data matrix 278 $X_D$. The resultant 8×1 vector forms one of the data symbols in the payload. The product of each of the data vectors in sequence and the same precode matrix forms each successive symbol in the payload 280D of the PPDU frame.

The PPDU frame 280, as specified in the IEEE 802.11ac standard for example, includes: the legacy portion 280A, and the VHT portion consisting of various control, training and payload fields shown. The legacy portion includes the: L-STF, L-LTF and L-SIG fields. All stations whether or not MU compliant, can listen to the legacy portion for WLAN collision avoidance, e.g. carrier sense multiple access (CSMA), and for synchronizing reception.

The VHT control portion includes: the VHT-SIG A field 280B, the VHT-STF and VHT-SIG B. The VHT-SIGA field contains bits which indicate what users, a.k.a. stations are going to receive what streams in an MU-MIMO downlink. In the example shown the VHT-SIGA field indicates only one user position which will receive streams, i.e. user 1 will be receiving streams 1-4 of the MU MIMO downlink. This overlapping assignment of user IDs and user stream assignments is possible due to the spatial processing of the compressed training field VHT-LTF 280C.

The VHT training portion includes the: VHT-LTF field 280C. The known training symbols in this field are used by the receiving station to determine how much the channel between the WAP and station has altered the known training vector and this information is used by the receiving station to improve reception of the payload portion 280D of the packet 280. The compressed precoding spatially separates the four training symbols into two sets of 4 streams each, so each receiving station 106, 108 trains on only its own four streams, i.e. hears only the four training streams and identifies itself as the same user 1 who will be receiving all four of the streams.

The VHT payload portion 180D of the PPDU frame may contain from 1 to over 1000 symbols of data precoded on each of the included streams, which is in this case is twice the number of streams, e.g. 8, supported by the prior art. Generally, the amount of data that can be carried increases directly with the number of streams supported. Thus the fact that in this example despite the station constraints, the WAP is still able to effect an MU downlink utilizing all 8 of its streams means that its downlink throughput is significantly increased. This state of affairs increases throughput and thus reduces the number of packets that need to be sent by the WAP 202 to transmit an arbitrary fixed amount of data in a given amount of time to the two stations 106-108 in the MU downlink group.

FIG. 3 is a hardware block diagram of the massive MU MIMO WAP 202 shown in FIG. 2A, in accordance with an embodiment of the invention. The WAP supports single user (SU) MIMO as well as multi-user (MU) MIMO transmission and reception. The WAP includes: a training module 306 and a wireless local area network (WLAN) stage 326 which includes eight discrete MIMO transceiver paths capable of transmission and reception of from one to eight streams. Only two transmit and two of the receive paths are shown in detail for clarity.

The MU MIMO transceiver path components include antennas 202A-H. The antennas are coupled to radio frequency (RF) module 334 and baseband module 328 of the WLAN stage 326, which implements in an embodiment of the invention the IEEE 802.11* standard for WLAN, with the '*' standing for the particular sub-standard, e.g. a, b, g, n, ac, ax.

A first MIMO receive path originates with the antenna 202A, and includes: low noise amplifier (LNA) 336A, the shared tunable oscillator 330 and mixer 338A which down converts the received data channel, for filtration by the channel filter 340A, conversion in the analog-to-digital converter (ADC) 342A and domain conversion from the frequency to the time domain in the Discrete Fourier Transform (DFT) module 344A. The corresponding MIMO components of the remaining receive paths are labeled with different suffix, e.g. suffix "H" for the components of the eighth receive path.

In the baseband module 328 the complex coefficients for each sub-channel in each symbol interval are subject to equalization in equalizer 346 followed by demapping in demapper 348A. The resultant bits are deinterleaved in deinterleaver 350A. Next the received data is multiplexed in stream multiplexer 352 and decoded and descrambled in the decoder and descrambler 354 which couples to the packet based bus 304. The corresponding MIMO components of remaining receive paths are labeled with different suffix, e.g. suffix "H" for the components of the eighth of the receive paths.

The transmit path components of two of the eight transmit paths in this embodiment of the invention are also shown. The data to be transmitted is encoded and scrambled in the encoder and scrambler 360. It is then demultiplexed into independent data paths one for each antenna in the stream demultiplexer 362. Next data is interleaved and mapped in the associated one of interleavers 364A, 364H and Mappers 366A, 366H. Next the complex coefficients corresponding to the data are spatially mapped in the spatial mapper 370 using a selected beamforming matrix. For an SU MIMO transmission the spatial mapper uses a single precode matrix to precode the training and data symbols. For an MU MIMO transmission to stations all of which support training on all the streams of the WAP, the spatial mapper uses a single precode matrix to precode the training and data symbols. Additionally, for an MU MIMO transmission to stations one or more of which do not support training on all the aggregate streams, the spatial mapper precodes the training symbols of each packet with a compressed precode matrix 262 and the payload portion of each packet with the precode matrix 254AB. Then the mapped coefficients of each sub-channel are transformed from the frequency domain to the time domain in the associated one of inverse discrete Fourier transform (IDFT) modules 372A, 372H.

Next, in the radio frequency module 334 the digital-to-analog (DAC) conversion is accomplished by the associated one of DACs 374A, 374H, followed by filtration by the associated one of channel filters 376A, 376H. Next the filtered signals are upconverted in the associated one of upconverters 378A, 378H and amplified by the associated one of power amplifiers 380A, 380H each coupled to an associated one of antennas 202A-H for transmission to the receiving device.

The transmit and receive paths operate under control of the training module 306. The training module includes: an MU grouping module 308 a constrained station identifier 310, a channel sounder 312, a precode matrix calculator 314, a training vector generator 316, and a precode matrix compressor 318, all of which are coupled to non-volatile memory or storage 320.

The MU grouping module 308 is configured to select a downlink MU group of at least two of the associated station nodes for concurrent reception of an MU MIMO downlink communication from the WAP apparatus and to allocate an aggregate number of downlink streams thereto.

The constrained station identifier 310 is configured to identify if any of the stations in the downlink MU Group are constrained stations that do not support training on the aggregate number of downlink streams allocated by the MU grouping module, and further in response to the identification of any such constrained stations in the MU group, to identify a limit on the number of training streams supported for a most constrained one of the stations.

The channel sounder 312 is configured for sounding each communication channel between the WAP and each of the at least two associated station nodes using at least one of an implicit sounding and an explicit sounding(s) to determine corresponding channel state information (CSI).

The precode matrix calculator 314 is configured to calculate a precode matrix "Q" for spatially separating the aggregate number of MU-MIMO downlink streams among corresponding receiving ones of the at least two associated station nodes.

The training vector generator 316 is configured to inject a training vector into the training portion of each packet a length of which varies in response to the the identification or absence of identification of a constrained station in the MU-Group by the constrained station identifier.

The precode matrix compressor 318 is configured to respond to the identification of any constrained stations in the MU group, by compressing the precode matrix Q into a compressed precode matrix "C(Q)" having a column dimension equal to the limit on the number of training streams supported by the most constrained one of the stations in the MU group.

The non-volatile memory or storage 320 is shown with normal, compressed training vectors 322A-B generated by the training module.

In an embodiment of the invention where the WAP 202 also includes a broadband interface 302 for interfacing with a digital signal line (DSL) or cable modem 300.

In an embodiment of the invention the training module may be instantiated on a processor running program code stored in non-volatile memory 320, without departing from the scope of the claimed invention.

FIG. 4 is a hardware block diagram of an MU-MIMO Station configured for improved stream characterization. In the instant embodiment of the invention, rather than compressing training symbols as discussed above and as can be implemented exclusively on the WAP, the focus in this embodiment of the invention is on improving the training on one or more streams which is achieved by adding more symbols to the training field. This latter embodiment of the invention shown in FIG. 4 improves channel estimates through averaging of the redundant training symbols across the overconstrained training space for one or more of the streams. Increasing the length of training sequences improves channel estimates at the receiver because it allows averaging of estimates. For an N symbol training sequence the noise variance on channel estimate is $\sigma^2/N$ instead of $\sigma^2$. The total noise after equalization becomes $\sigma^2(1+1/N)$ instead of $2\sigma^2$. Novel components on both the transmitting WAP and the receiving station(s) are shown for achieving these improved channel estimates. In contrast to the training symbol compression embodiment of the invention discussed above which is practiced on MU-MIMO downlinks, this embodiment of the invention may be practiced on the training field of SU MIMO or MU MIMO transmissions, either of which can benefit from improved channel estimates.

This embodiment of the invention may be used separately or together with the embodiment of the invention discussed above in FIGS. 2-3, and in the following FIG. 5. This embodiment of the invention requires for its practice none of the modules 310, 316, 318 discussed in FIG. 3, though it can be used in conjunction with same.

This embodiment of the invention requires a component on the WAP shown in FIG. 3 which was not previously discussed because it was not part of the training symbol compression embodiment of the invention. That component is the overconstrained symbol set generator 319 on the WAP shown in FIG. 3. It is used to generate redundant training symbols, a.k.a. overconstrained training symbols 322C for one or more streams of a single user (SU) or MU MIMO packet. Channel estimation during training is affected by the same noise that is present during data reception. Equalizer coefficients derived from the noisy channel estimate propagate the noise to the equalized constellation points. This effectively leads to a doubling of the noise or a 3 dB reduction in post-equalizer SNR compared to noise-free channel estimate. Increased training length are an efficient way to gain 1-2 db in error vector magnitude (EVM). In the case of an MU MIMO packet, the overconstrained symbol set generator is configured to inject into the training portion of selected downlink packets an overconstrained set of at least two training symbols for a selected one of the streams, which in combination provide additional training for the selected one of the streams to the corresponding receiving one of the at least two stations in the MU-group. In the case of an SU MIMO packet, the overconstrained symbol set generator is configured to inject into the training portion of selected downlink packets an overconstrained set of at least two training symbols for a selected one of the streams, which in combination provide additional training for the selected one of the streams to the corresponding receiving station. The overconstrained symbol generator has its own pre-identified optional bits in the VHT-SIGA field into which it injects overconstrained symbol set indicia (OSSI) 282 as shown in FIG. 2, to signal the suitably equipped station as shown in FIG. 4 as to the stream or streams subject to the redundancy and the amount of said redundant training symbols.

The station 408 shown in FIG. 4 is shown as 4×4 TV with a novel enhanced channel estimator 406 in accordance with this embodiment of the invention. The WAP supports single user (SU) MIMO as well as multi-user (MU) MIMO transmission and reception. The station includes: an enhanced channel estimator, HDTV circuitry 402 and a wireless local area network (WLAN) stage 426 which includes four discrete MIMO transceiver paths capable of transmission and reception of from one to four streams. Only two transmit and two of the receive paths are shown in detail for clarity.

The MU MIMO transceiver path components include antennas 408A-D. The antennas are coupled to radio frequency (RF) module 434 and baseband module 428 of the WLAN stage 426, which implements in an embodiment of the invention the IEEE 802.11* standard for WLAN, with the '*' standing for the particular sub-standard, e.g. a, b, g, n, ac, ax.

A first MIMO receive path originates with the antenna 408A, and includes: low noise amplifier (LNA) 436A, the shared tunable oscillator 430 and mixer 438A which down converts the received data channel, for filtration by the channel filter 440A, conversion in the ADC 442A and domain conversion from the frequency to the time domain in the DFT module 444A. The corresponding MIMO components of the remaining receive paths are labeled with different suffix, e.g. suffix "D" for the components of the fourth receive path.

In the baseband module 428 the complex coefficients for each sub-channel in each symbol interval are subject to equalization in equalizer 446 followed by demapping in demapper 448A. The resultant bits are deinterleaved in deinterleaver 450A. Next the received data is multiplexed in stream multiplexer 452 and decoded and descrambled in the decoder and descrambler 454 which couples to the packet based bus 404. The corresponding MIMO components of remaining receive paths are labeled with different suffix, e.g. suffix "D" for the components of the fourth of the receive paths.

The transmit path components of two of the four transmit paths in this embodiment of the invention are also shown. The data to be transmitted is encoded and scrambled in the encoder and scrambler 460. It is then demultiplexed into independent data paths one for each antenna in the stream demultiplexer 462. Next data is interleaved and mapped in the associated one of interleavers 464A, 464D and Mappers 466A, 466D. Next the complex coefficients corresponding to the data are spatially mapped in the spatial mapper 470 using a beamforming matrix. Then the mapped coefficients of each sub-channel are transformed from the frequency domain to the time domain in the associated one of IDFT modules 472A, 472D.

Next, in the radio frequency module 434 the DAC conversion is accomplished by the associated one of DACs 474A, 474D, followed by filtration by the associated one of channel filters 476A, 476D. Next the filtered signals are upconverted in the associated one of upconverters 478A, 478D and amplified by the associated one of power amplifiers 480A, 480D each coupled to an associated one of antennas 408A-D for transmission to the WAP.

The transmit and receive paths operate under control of the enhanced channel estimator 406. The enhanced channel estimator module includes: a channel estimator 408; an overconstrained symbol set identifier, a channel average, and a sounding feedback calculator, all of which are coupled to non-volatile memory or storage 420.

The channel estimator 408 estimates the channel and resultant equalization matrix to be used for the received packet, based on the training field thereof.

The overconstrained symbol set identifier 410 is configured to read the VHT-SIGA field of received packets and determine based on the OSSI control bits thereof whether or not there are redundant symbols in the training field of the received packet, and if so the stream(s) to which the training redundancy applies.

The channel average 412 operates under the control of the channel estimator when there are redundant symbols in the received training field, to average channel estimates derived from each of those redundant symbols with one another, and passes the result back to the channel estimator, where they are used for equalizing the payload data portion of the received packet.

The sounding feedback calculator 414 is coupled to the channel estimator and channel average to provide a beamsteering matrix and accompanying SNR matrix back to a requesting WAP in response to an explicit sounding, the accuracy of which may be improved when the sounding field includes an overconstrained set of symbols.

The non-volatile memory or storage 420 stores channel estimates or average channel estimates 422 as provided by the enhanced channel estimator.

In an embodiment of the invention the enhanced channel estimator module may be instantiated on a processor running program code stored in non-volatile memory 420, without departing from the scope of the claimed invention.

FIG. 5 is a process flow diagram of processes associated with enhanced massive MU MIMO downlinks from the WAP shown in FIGS. 2-3. The processing is focused on MU-MIMO transmission although the WAP itself is capable of both SU and MU MIMO transmission. Processing begins with the capabilities exchange 500 during which each station's capabilities, e.g. MU MIMO support, beamsteering feedback number of streams, and other information are determined by the WAP. Control then passes to process 502 in which the WAP selects from among those stations which have identified themselves as being MU compliant, a group of stations for an MU downlink. The number of streams to be sent to each station in the group is determined and from that an aggregate number of streams is identified in process 504. For example, if 4 streams are to be sent to each of two stations in the MU group, then the aggregate number of streams will be eight. The aggregate number of streams will not always be equal to the number of streams supported by the WAP, but ideally will be as close to that as possible. For example, if the MU Group includes 3 stations with capability for receiving 2 streams each, then the aggregate number of streams sent by the WAP, e.g. an 8×8 WAP will be 6 streams.

Next, control is passed to process 506. In process 506 a determination is made as to whether there are any "Constrained" stations in the MU group. Constrained stations are those which are not capable of processing a training field in which the number of streams equals the aggregate number of streams targeted for the MU MIMO downlink. This information is typically determined indirectly during the capabilities exchange when each station identifies the number of streams it is capable of providing beamsteering information for in a sounding feedback packet. Typically, this is the same number of streams as it is capable of training on in a PPDU. A determination that a station is constrained is a relative determination, not an absolute determination. A station that is constrained in the context of one MU MIMO group may not be constrained in the context of another. For example, if a WLAN consists of an 8×8 WAP and several stations one of which is a 2×2 capable of training on 4 streams it will not be constrained when it is part of an MU MIMO group with an aggregate of 4 streams, e.g. itself and two 1×1 stations but it will be constrained when it is part of an MU group with an aggregate of 8 streams, e.g. itself, and another 4×4 station.

Next control is passed to decision process 510 in which a determination is made as to whether there are any constrained stations in the MU Group. If the determination is negative, i.e. that there are not any constrained stations in the MU MIMO group, then control passes to process 520. This processing branch is utilized for MU groups in which each station is capable of processing a training field which contains symbols carrying all of the aggregate streams sent to all members of the MU group and which are precoded with the same precode matrix as will be used for the subsequent payload portion of the packet. In process 520 an explicit MU MIMO sounding is conducted of all stations in the MU group. Next in process 524 the MU MIMO precode matrix $Q_{1-n}$ with a number of columns equal to the aggregate number of streams is calculated. Control is then passed to processes 534-538 within the block of processes 550 related to generating the control field, e.g. VHT-SIGA, and training field, e.g. VHT-LTF, for a downlink MU MIMO transmission. In process 534 the training vector "X" with a number of elements equal to the number of columns equal to the number of columns in the precode matrix $Q_{1-n}$ is generated. Next in process 536 the training field, e.g. VHT-LTF of the MU MIMO packet is constructed where the number of training symbols equals or approximately equals the number of columns of $Q_{1-n}$. In the case of an MU MIMO 802.11ac compliant downlink with 7 aggregate streams the number of symbols will be 8. The IEEE 802.11ac standard requires that where the streams are odd the number of symbols will be the next higher even number, e.g. Ceiling(#AggregateStreams/2)×2. Next in process 538 the control field, e.g. VHT-SIGA) is injected with an indicia of each user or station in the MU group and the specific stream(s) allocated to each. Control is then passed to process 570.

If alternately in decision process 510 an affirmative determination, i.e. that there one or more constrained stations in the MU MIMO group then control is passed to process 542. In process 542 soundings implicit or explicit soundings are conducted to determine for all stations in the MU group both constrained and compliant, the channel state information or beamsteering and SNR feedback matrices from which the precode matrix for the entire set of aggregate streams may be determined. In the following process 544 this MU MIMO precode matrix $Q_{1-n}$ is determined with a number of columns equal to the aggregate number of streams allocated to the MU MIMO downlink. Control is then passed to processes 552-560 within the block of processes 550 related to generating the control field, e.g. VHT-SIGA, and training field, e.g. VHT-LTF, for a downlink MU MIMO transmission. In process 552 the most constrained station in the MU-MIMO group is identified, in terms of the cap or limit on the number of streams over which it is capable of training. If there is only one constrained station in the group, then it is the most constrained station. Control is then passed to process 554 in which the MU precode matrix is compressed to a compressed precode matrix $C(Q_{1-n})$ in which the number of columns is less than or equal to the maximum number of training streams that can be processed by the most constrained of the MU MIMO stations in the MU MIMO group. Compression is accomplished on the columns of the precode matrix associated with stream(s) allocated to two or more users equally. For example, if user/station 1 and 2 are each allocated two streams in the precode matrix, then those two pairs of columns can be additively combined into a single pair of resultant columns thus compressing the column dimension of the precode matrix by 2. Control is then passed to process 556 in which the compressed training vector C(X) is generated with a number of elements equal to the number of columns of the compressed precode matrix $C(Q_{1-n})$. Next in process 558 the training field, e.g. VHT-LTF of the MU MIMO downlink packet is constructed where the number of training symbols is equal to or approximately equal to the number of columns of the compressed precode matrix $C(Q_{1-n})$. The resultant training field remains compliant with the IEEE 802.11ac standard, e.g. Ceiling(#Columns of $C(Q_{1-n})$/2)×2. Control is then passed to process 560. In process 560 the control field e.g. VHT-SIGA) is injected with indicia of each user or station in the MU group with the exception of users/stations in the MU group for whom the targeted streams of in the precode matrix were combined during compression, in which case only one of the two or more users and allocated streams will be provided a control indicium in the VHT-SIGA field. Control is then passed to process 570.

In process 570 the payload vector $X_{1-n}$ is for all streams and for each payload symbol is determined. Next in process 572 the payload field for the MUMIMO packet is constructed where each symbol is the product of the MU MIMO precode matrix $Q_{1-n}$ and the corresponding one of the payload vectors X1-n. Next in process 574 the MU MIMO downlink packet is transmitted to all targeted station in the MU MIMO group.

Most MU-MIMO capable STAs today provide at most four-stream sounding feedback. This is a problem in itself, since an 8×8 system will only really differentiate itself from a 4×4 in terms of MU-MIMO and beamforming capabilities if it has access to higher-dimensional channel feedback (i.e. more than four stream sounding and sounding feedback).

The problem of getting eight-stream feedback from a four-stream capable STA could be addressed, albeit at higher complexity and overhead through implicit sounding or sequential explicit soundings for example. However, even if this can be done, a separate problem remains. According to the current version of the 11ac standard, a STA that only provides four-stream feedback is also limited to receiving at most $N_{STS,total}=4$. This means that even if the AP can learn enough about the channel to build an eight-stream precoding matrix, it wouldn't be able to send MU transmissions with more than four streams total to such a STA. Even if the current standard changes to decouple the support of $N_{STS,total}>4$ from the sounding capability, there will remain plenty of devices that will not implement the higher $N_{STS,total}$.

Table 1 shows all possible assignments of streams to users with $N_{STS,total}>4$. No single user ever gets more than four streams, but the limiting factor in sending one of these configurations is $N_{STS,total}$. Note that in Table 1, every permutation of streams shown in a given row is also a possible configuration.

TABLE 1

Unsupported Config for STA with Training limit of 4 Streams

| | #Streams | | | | |
|---|---|---|---|---|---|
| | User 1 | User 2 | User 3 | User 4 | Total |
| 1 | 1 | 1 | 1 | 2 | 5 |
| 2 | 1 | 2 | 2 | — | 5 |
| 3 | 1 | 1 | 3 | — | 5 |
| 4 | 2 | 3 | — | — | 5 |
| 5 | 1 | 4 | — | — | 5 |
| 6 | 1 | 1 | 1 | 3 | 6 |
| 7 | 1 | 1 | 2 | 2 | 6 |
| 8 | 2 | 2 | 2 | — | 6 |
| 9 | 3 | 3 | — | — | 6 |
| 10 | 1 | 2 | 3 | — | 6 |
| 11 | 1 | 1 | 4 | — | 6 |

TABLE 1-continued

Unsupported Config for STA with Training limit of 4 Streams

| | #Streams | | | | |
|---|---|---|---|---|---|
| | User 1 | User 2 | User 3 | User 4 | Total |
| 12 | 2 | 4 | — | — | 6 |
| 13 | 1 | 2 | 2 | 2 | 7 |
| 14 | 1 | 3 | 3 | — | 7 |
| 15 | 1 | 1 | 1 | 4 | 7 |
| 16 | 2 | 2 | 3 | — | 7 |
| 17 | 1 | 1 | 2 | 3 | 7 |
| 18 | 1 | 2 | 4 | — | 7 |
| 19 | 3 | 4 | — | — | 7 |
| 20 | 1 | 1 | 3 | 3 | 8 |
| 21 | 2 | 2 | 2 | 2 | 8 |
| 22 | 4 | 4 | — | — | 8 |
| 23 | 1 | 1 | — | 4 | 8 |
| 24 | 2 | 3 | — | — | 8 |
| 25 | 2 | 2 | — | — | 8 |
| 26 | 1 | 3 | — | — | 8 |

Illustration: The idea of compressed training is to "trick" the receiving STA into believing that the total number of streams in the MU transmission is four (or less), while the actual number is higher than four. This requires two things:
1. The additional streams should be cancelled at the receiver
2. Channel estimation should be done such that the channel estimation for the lower number of streams still allows equalization of the MU signal containing all streams Throughout this example we will assume that the STA has at minimum a capability to sound four streams. This seems to be the industry practice and is also explicitly required for 11ac Wave 2 certification.

When zero-forcing precoding is used, one can modify the VHT-LTF precoding relative to the data precoding in such a way that it becomes possible in theory to send more than $N_{STS,total}=4$ in a way that is transparent to STAs that don't support $N_{STS,total}>4$. Doing so relies on a number of assumptions. To illustrate, let's consider the case of an 8×8 WAP sending an MU MIMO downlink to two 4×4 users/stations. If ZF precoding is used, we have:

$$H_1 Q_2 = 0$$

$$H_2 Q_1 = 0 \quad (1)$$

$Q_1$ and $Q_2$ are the precoding matrices for the first and second user respectively. An MU transmission containing data for both users would be precoded as:

$$X = [Q_1 \ Q_2] CSD_{8\times 8} \begin{bmatrix} X_1 \\ X_2 \end{bmatrix} \quad (2)$$

Note that because $CSD_{8\times 8}$ is a diagonal matrix, (2) can also be written as (assuming 4+4):

$$X = Q_1 CSD_{8\times 8}(1:4,1:4)X_1 + Q_2 CSD_{8\times 8}(5:8,5:8)X_2 \quad (3)$$

This precoding is used for both the training signal and the data. If the number of streams to each user is four, this would involve sending a VHT-LTF with eight training symbols, which one or more of the STAs may not support. Instead of sending eight streams in VHT-LTF, we consider the following precoding for VHT-LTF only, while leaving the precoding for the data unchanged (as in (2) or (3)).

$$X_{VHT-LTF} = (Q_1 CSD_{8\times 8}(1:4,1:4) + Q_2 CSD_{8\times 8}(5:8,5:8))X \quad (4)$$

In (4), X is a four-dimensional vector allowing the receiver to estimate a four-stream channel. Note that this can only be done if both users have the same number of streams. Instead of eight training symbols, the modified VHT-LTF would now consist of four training symbols. STA1 would receive the following training sequence:

$$X_{VHT-LTF,1} = H_1(Q_1 CSD_{8\times 8}(1:4,1:4) + Q_2 CSD_{8\times 8}(5:8,5:8))X \quad (5)$$

Assuming that the precoding (1) is perfect, this is equal to:

$$X_{VHT-LTF,1} = H_1 Q_1 CSD_{8\times 8}(1:4,1:4)X \quad (6)$$

Likewise, STA2 would receive the training sequence:

$$X_{VHT-LTF,2} = H_2 Q_2 CSD_{8\times 8}(5:8,5:8)X \quad (7)$$

During data transmission, STA1 receives the following signal:

$$X_{Data,1} = H_1(Q_1 CSD_{8\times 8}(1:4,1:4)X_1 + Q_2 CSD_{8\times 8}(5:8,5:8)X_2) = H_1 Q_1 CSD_{8\times 8}(1:4,1:4)X_1 \quad (8)$$

This means that even though different precoding (4) was used during the training sequence and data transmission (2), the precoding affects the channel in such a way that the channel estimated during VHT-LTF is actually the same as the one used during data transmission. The same is true at the other STA. Therefore, both STA1 and STA2 can successfully equalize their channels to retrieve four-stream $X_1$ and $X_2$ respectively. All this relies on the precoding being efficient in removing interference at the antennas (see (1)). In addition, some special restrictions exist in the way the transmission is configured in the preamble (specifically VHT-SIG-A and VHT-SIG-B).

For the example given here, the configuration for VHT-SIG-A is as follows: a) Both users have been pre-configured with the same USER_POSITION in their shared MU group; b) VHT-SIG-A looks like the VHT-SIG-A for an MU-type transmission with only a single user; c) Both STAs will extract the number of streams and use that to recover their data. As such, the number of streams for both users need to be the same; and. d) Both STAs need to use the same coding type since there is only one indication of coding type per user position.

Although the number of streams has to be identical for this scheme to work, the MCS can be different because that information is conveyed on a per-user basis in VHT-SIG-B when the packet is an MU packet.

The example above is given for two users with equal number of streams. Not every configuration in Table 1 can be handled in this way. Table 2 shows a list of configurations (a subset from Table 1) for which a similar approach may be used.

TABLE 2

Compressed Training Configs with $N_{STS}$ Total > 4

| # Streams | | | | | | VHT-SIG-A | | | | | | | | |
|---|---|---|---|---|---|---|---|---|---|---|---|---|---|---|
| | | | | | USER POSITION | | | | (Streams) | | | | | |
| U1 | U2 | U3 | U4 | Q VHT-LTF | U1 | U2 | U3 | U4 | P0 | P1 | P2 | P3 | #Streams | #Users |
| 1 | 1 | 1 | 2 | 5 [Q1 + Q2 Q3 Q4] | 0 | 0 | 1 | 2 | 1 | 1 | 2 | | 4 | 3 |
| 1 | 2 | 2 | | 5 [Q1 Q2 + Q3] | 0 | 1 | 1 | | 1 | 2 | | | 3 | 2 |
| 1 | 1 | 3 | | 5 [Q1 + Q2 Q3] | 0 | 0 | 1 | | 1 | 3 | | | 4 | 2 |

TABLE 2-continued

Compressed Training Configs with $N_{STS}$ Total > 4

| # Streams | | | | Q VHT-LTF | USER POSITION | | | | VHT-SIG-A (Streams) | | | | #Streams | #Users |
|---|---|---|---|---|---|---|---|---|---|---|---|---|---|---|
| U1 | U2 | U3 | U4 | | U1 | U2 | U3 | U4 | P0 | P1 | P2 | P3 | | |
| 1 | 1 | 1 | 3 | 6 [Q1 + Q2 + Q3 Q4] | 0 | 0 | 0 | 1 | 1 | 3 | | | 4 | 2 |
| 1 | 1 | 2 | 2 | 6 [Q1 Q2 Q3 + Q4] | 0 | 1 | 2 | 2 | 1 | 1 | 2 | | 4 | 3 |
| 2 | 2 | 2 | | 6 [Q1 + Q2 Q3] | 0 | 0 | 1 | | 2 | 2 | | | 4 | 2 |
| 3 | 3 | | | 6 [Q1 + Q2] | 0 | 0 | | | 3 | | | | 3 | 1 |
| 1 | 2 | 2 | 2 | 7 [Q1 Q2 + Q3 + Q4] | 0 | 1 | 1 | 1 | 1 | 2 | | | 3 | 2 |
| 1 | 3 | 3 | | 7 [Q1 Q2 + Q3] | 0 | 1 | 1 | | 1 | 3 | | | 4 | 2 |
| 1 | 1 | 3 | 3 | 8 [Q1 + Q2 Q3 + Q4] | 0 | 0 | 1 | 1 | 1 | 3 | | | 4 | 2 |
| 2 | 2 | 2 | 2 | 8 [Q1 + Q2 Q3 + Q4] | 0 | 0 | 1 | 1 | 2 | 2 | | | 4 | 2 |
| 4 | 4 | | | 8 [Q1 + Q2] | 0 | 0 | | | 4 | | | | 4 | 1 |

Table 2 shows the number of streams per user and how user position can be assigned. Also in Table 2, it is assumed that the precoding for user "i" is given by the $N_{TX} \times N_{STS,i}$ matrix $Q_i$. The column labeled "Q VHT-LTF" in Table 2 then shows how the precoding matrix for VHT-LTF is derived from the full precoding matrix $Q=[Q_1 \ldots Q_{Nuser}]$. In some cases, more than one VHT-LTF precoding matrix is possible. For instance, for $N_{STS,u}=[1\ 1\ 1\ 2]$, the VHT-LTF precoding matrix could be $[Q_1+Q_2\ Q_3\ Q_4]$, $[Q_1+Q_3\ Q_2\ Q_4]$ or $[Q_1\ Q_2+Q_3\ Q_4]$ or even $[Q_1+Q_2+Q_3\ Q_4]$, provided that the user positions are also changed accordingly. Note that Table 2 does not explicitly show the CSD. In practice, each of the matrices $Q_i$ will be right-multiplied with a diagonal matrix derived from the full $N_{STS,total} \times N_{STS,total}$ diagonal CSD matrix. With the 12 configurations shown in Table 2, there remain 14 that cannot be directly supported.

These configurations are shown in Table 3.

TABLE 3

Configurations that can't use compressed training

| # Streams | | | | Total |
|---|---|---|---|---|
| User 1 | User 2 | User 3 | User 4 | Streams |
| 2 | 3 | | | 5 |
| 1 | 4 | | | 5 |
| 1 | 2 | 3 | | 6 |
| 1 | 1 | 4 | | 6 |
| 2 | 4 | | | 6 |
| 1 | 1 | 1 | 4 | 7 |
| 2 | 2 | 3 | | 7 |
| 1 | 1 | 2 | 3 | 7 |
| 1 | 2 | 4 | | 7 |
| 3 | 4 | | | 7 |
| 1 | 1 | 2 | 4 | 8 |
| 2 | 3 | 3 | | 8 |
| 2 | 2 | 4 | | 8 |
| 1 | 3 | 4 | | 8 |

The strategy for the configurations in Table 3 could be to replace each of these configurations with the "closest" supported configuration.

An example of this is shown in Table 4, where the substitution tends to be conservative. This means that $N_{STS,total}$ for the alternative configuration is always lower than for the original one.

TABLE 4

Possible substitution of non-supported configurations

| Not supported | | | | | Replace with: | | | | |
|---|---|---|---|---|---|---|---|---|---|
| # Streams | | | | | # Streams | | | | |
| U1 | U2 | U3 | U4 | Total | U1 | U2 | U3 | U4 | Total |
| 2 | 3 | | | 5 | 2 | 2 | | | 4 |
| 1 | 4 | | | 5 | 1 | 3 | | | 4 |
| 1 | 2 | 3 | | 6 | 1 | 1 | 3 | | 5 |
| 1 | 1 | 4 | | 6 | 1 | 1 | 3 | | 5 |
| 2 | 4 | | | 6 | 2 | 2 | | | 4 |
| 1 | 1 | 1 | 4 | 7 | 1 | 1 | 1 | 3 | 6 |
| 2 | 2 | 3 | | 7 | 2 | 2 | 2 | | 6 |
| 1 | 1 | 2 | 3 | 7 | 1 | 1 | 1 | 3 | 6 |
| 1 | 2 | 4 | | 7 | 1 | 1 | 3 | | 5 |
| 3 | 4 | | | 7 | 3 | 3 | | | 6 |
| 1 | 1 | 2 | 4 | 8 | 1 | 1 | 1 | 3 | 6 |
| 2 | 3 | 3 | | 8 | 1 | 3 | 3 | | 7 |
| 2 | 2 | 4 | | 8 | 2 | 2 | 2 | | 6 |
| 1 | 3 | 4 | | 8 | 1 | 2 | 2 | | 5 |

Pre-Defining Groups and User Positions: Group assignments and assignment of user positions are done through the exchange of dedicated management frames. The assignments are semi-static in the sense that they don't change regularly. A STA keeps it group membership and its user position within each group until the assignment is explicitly changed by the AP. Since we may need to choose different user position assignments for the same group of STAs depending on the number of streams we want to send to each STA, a number of groups will have to be assigned to the same set of STAs.

As an example consider the case of three 2×2 STAs. We expect to send simultaneous transmissions to the three receivers, but the number of streams for each STA could be either one or two. Table 5 shows all possible stream allocations for these three users.

TABLE 5

Possible permutations for three 2 × 2 stations

| # Streams | | | User Position | | | |
|---|---|---|---|---|---|---|
| U1 | U2 | U3 | U1 | U2 | U3 | Total |
| 1 | 1 | 1 | 1 | 0 | 1 | 2 | 3 |
| 2 | 1 | 1 | 2 | 0 | 1 | 2 | 4 |
| 3 | 1 | 2 | 1 | 0 | 1 | 2 | 4 |
| 4 | 2 | 1 | 1 | 0 | 1 | 2 | 4 |
| 5 | 1 | 2 | 2 | 0 | 1 | 1 | 5 |

TABLE 5-continued

Possible permutations for three 2 × 2 stations

| | # Streams | | | User Position | | | |
|---|---|---|---|---|---|---|---|
| | U1 | U2 | U3 | U1 | U2 | U3 | Total |
| 6 | 2 | 1 | 2 | 1 | 0 | 1 | 5 |
| 7 | 2 | 2 | 1 | 0 | 1 | 1 | 5 |
| 8 | 2 | 2 | 2 | 0 | 1 | 1 | 6 |

For all combinations in Table 5 that have $N_{STS,total} \leq 4$, we can use a different user position for each user. For the others, we need at least two STAs to share a user position. Depending on which two STAs have an identical number of streams, a different user position assignment and hence a different group ID is needed.

To cover all case in Table 5, we would need a minimum of four group assignments, as shown in Table 6.

TABLE 6

Group Definitions to cover all cased in Table 5

| GROUP | User Position | | |
|---|---|---|---|
| ID | U 1 | U 2 | U 3 |
| 1 | 0 | 1 | 2 |
| 2 | 0 | 1 | 1 |
| 3 | 1 | 0 | 1 |
| 4 | 0 | 1 | 1 |

Group ID "1" in Table 6 can be used for cases 1, 2, 3 and 4. GROUP ID "2" can be used for case 5, GROUP ID "3" can be used for case 6 and GROUP ID "3" can be used for case 7. Case 8 can use either GROUP ID "2", "3" or "4". If all STAs support $N_{STS,total} > 4$, only a single assignment (GROUP ID "1") would be needed.

Conclusions: When STAs don't support reception of MU transmissions with more than four total streams, the precoding and preamble configuration could be designed to "trick" the receiver into believing that it is processing an MU packet with four streams or less, even though more than four streams were encoded at the transmitter. Not every combination of streams and users can be supported. Also, using this method would involve creating multiple groups for the same set of STAs to make sure that a group with the appropriate set of user positions is available to send the MU packet. There is a small performance penalty for using this method. Data: For data transmissions, there are no changes to spatial mapping or any of the other blocks. The only thing that needs to be accounted for is to make sure that the precoding matrices have the correct cancellation properties. In practice this means that when there are two or more users in the same group, the signal of at most one of those users should be non-zero at each of the receivers.

The components and processes disclosed herein may be implemented a software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) supporting wireless communications with associated stations on a selected communication channel; and the WAP comprising:
   a plurality of antennas;
   a plurality of components coupled to one another to form a plurality of the transmit and receive paths each coupled to as corresponding one of the plurality of antennas for multiple-input multiple-output (MIMO) communications on the selected communication channel;
   a multi-user (MU) grouping module coupled to the plurality of components to select a MU group of at least two of the associated stations and to allocate an aggregate number of streams for transmission to the MU group;
   a constrained station identifier coupled to the plurality of components to identify if any of the stations in the MU group are constrained stations that do not support training on the aggregate number of streams allocated by the MU grouping module, and in response to the identification of any constrained stations to further identify a limit on the number of training streams supported by a most constrained one of the stations;
   a channel sounder coupled to the plurality of components to sound the stations in the MU group for channel state information (CSI);
   a precode matrix calculator coupled to the channel sounder to calculate from the CSI obtained by the channel sounder a full precode matrix "Q" having a column dimension equal to the aggregate number of streams allocated by the MU grouping module, for precoding communications to the MU group;
   a precode matrix compressor responsive to the identification of any constrained stations in the MU group by the constrained station identifier, to compress the full precode matrix Q into a compressed precode matrix "C(Q)" having a column dimension equal to the limit on the number of training streams supported by the most constrained one of the stations in the MU group as identified by the constrained station identifier; and
   a spatial mapper component of the plurality of components spatially mapping an OFDM wireless transmission of a downlink MU-MIMO packet to the stations in the MU group, including spatially mapping the transmission of a payload portion of the MU-MIMO downlink packet using the full precede matrix Q and spatially mapping the transmission of a training portion of the MU-MIMO downlink packet using a selected one of the compressed precode matrix C(Q) responsive to the identification by the constrained station identifier of a constrained station in the MU group and the full precode matrix Q absent said identification.

2. The WAP of claim 1, further comprising:
   the constrained station identifier further to identify constrained stations based on a direct correlation between an identified number of sounding feedback streams supported by each of the stations in the MU group and the number of training streams supported thereby.

3. The WAP of claim 1, further comprising:
   the channel sounder module using at least one of an implicit sounding and an explicit sounding to determine corresponding CSI.

4. The WAP of claim 1, further comprising:
the precode matrix calculator configured to calculate the precede matrix "Q" utilizing CSI as to each downlink communication channel and zero forcing precoding.

5. The WAP of claim 1, further comprising:
the precode matrix compressor further to compress the precode matrix Q by additively combining at least two selected columns of the precode matrix Q into a single column.

6. The WAP of claim 1, further comprising:
the precode matrix compressor further to compress the precode matrix Q by additively combining columns of the precode matrix associated with streams destined for discrete stations in the MU group having equal numbers of downlink transmission streams.

7. The WAP of claim 1, further comprising:
the MU grouping module responsive to the identification of any constrained stations in the MU group by the constrained station identifier to inject into a "VHT-SIG-A" field of the MU-MIMO downlink packet an indicia of overlapping user positions for at least two stations in the MU group.

8. The WAP of claim 1, further comprising:
a training vector generator coupled to the spatial mapper and to inject a training vector into the training portion of the MU-MIMO downlink packet a length of which training vector varies in response to the identification or absence of identification of a constrained station in the MU group by the constrained station identifier.

9. The WAP of claim 1, further comprising:
an overconstrained symbol set generator to inject: into the training portion of the MU-MIMO downlink packet additional training symbols for a selected one of the streams.

10. A method for operating a wireless access point (WAP) having a plurality of antenna and supporting multiple-input multiple-output (MIMO) wireless communications with associated stations on a selected one of a plurality of orthogonal frequency-division multiplexed (OFDM) communication channels; and the method comprising the acts of:
selecting a downlink MU group of at least two of the associated stations and an aggregate number of streams for transmission to the MU group;
identifying if any of the stations in the MU Group are constrained stations that do not support training on the aggregate number of streams, and in response to the identification of any constrained stations to further identify a limit on the number of training streams supported by a most constrained one of the constrained stations;
sounding the stations in the MU group for channel state information (CSI);
calculating from the CSI obtained in the sounding act, a full precode matrix "Q" having a column dimension equal to the aggregate number of streams for for precoding communications to the MU group;
compressing the full precode matrix Q, into a compressed precode matrix "C(Q)" having a column dimension equal to the limit on the number of training streams supported by the most constrained one of the stations in the MU group, responsive to the identification of any constrained stations in the identifying act;
spatially mapping a MU-MIMO OFDM wireless transmission of a downlink MU-MIMO packet to the stations in the MU group, including
spatially mapping the transmission of a payload portion of the MU MIMO downlink packet using the full precode matrix Q; and
spatially mapping the transmission of a training portion of the MU MIMO downlink packet using a selected one of the compressed precode matrix C(Q) responsive to the identification in the identifying act of a constrained station in the MU group and the full precode matrix Q absent the identification in the identifying act of any constrained stations in the MU group.

11. The method for operating a WAP of claim 10, wherein the identifying act further comprises:
identifying constrained stations based on a direct correlation between an identified number of sounding feedback streams supported by each of the stations in the MU group and the number of training streams supported thereby.

12. The method for operating a WAP of claim 10, wherein the sounding act further comprises:
sounding each communication channel between the WAP and each of the at least two associated stations using at least one of an implicit sounding and an explicit sounding to determine corresponding CSI.

13. The method for operating a WAP of claim 10, wherein the calculating act further comprises:
calculating the precode matrix "Q" utilizing CSI as to each downlink communication channel and zero forcing precoding.

14. The method for operating a WAP of claim 10, wherein the compressing act further comprises:
additively combining at least two selected columns of the precode matrix Q into a single column.

15. The method for operating a WAP of claim 10, wherein the compressing act further comprises:
additively combining columns of the precode matrix Q associated with streams destined for discrete stations in the MU group having equal numbers of downlink transmission streams in the MU-MIMO group.

16. The method for operating a WAP of claim 10, wherein the selecting act further comprises:
injecting a "VHT-SIG-A" field of the MU-MIMO downlink packet an indicia of overlapping user positions for at least two stations in the MU group, responsive to the identification in the identifying act of any constrained stations in the MU group.

17. The method for operating a WAP of claim 10, further comprising:
injecting a training vector into the training portion of the MU-MIMO downlink packet a length of which training vector varies in response to the identification or absence of identification of a constrained station in the MU group in the identifying act.

18. The method for operating a WAP of claim 10, further comprising:
injecting into the training portion of the MU-MIMO downlink packet additional training symbols for a selected one of the streams.

* * * * *